(12) United States Patent
Schoeny et al.

(10) Patent No.: US 10,368,478 B2
(45) Date of Patent: Aug. 6, 2019

(54) MULTIPLE VARIETY SEED METER WITH SEGMENTED SUMP ARRANGEMENT AND SEED SWITCHING ARRANGEMENT

(71) Applicant: CNH Industrial America LLC, New Holland, PA (US)

(72) Inventors: Christopher Schoeny, Yorkville, IL (US); Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 72 days.

(21) Appl. No.: 15/622,162

(22) Filed: Jun. 14, 2017

(65) Prior Publication Data
US 2018/0359910 A1    Dec. 20, 2018

(51) Int. Cl.
| | | |
|---|---|---|
| A01C 7/08 | (2006.01) | |
| A01C 7/04 | (2006.01) | |
| A01C 7/12 | (2006.01) | |
| A01C 21/00 | (2006.01) | |

(52) U.S. Cl.
CPC .............. *A01C 7/084* (2013.01); *A01C 7/044* (2013.01); *A01C 7/046* (2013.01); *A01C 7/121* (2013.01); *A01C 21/005* (2013.01); *A01C 7/081* (2013.01)

(58) Field of Classification Search
CPC ........... A01C 7/084; A01C 7/081; A01C 7/08; A01C 7/00; A01C 7/044; A01C 7/042; A01C 7/04; A01C 7/121; A01C 7/12; A01C 7/046; A01C 21/005; A01C 21/00
See application file for complete search history.

(56) References Cited

U.S. PATENT DOCUMENTS

| | | | |
|---|---|---|---|
| 3,572,547 | A | 3/1971 | Walberg |
| 5,915,313 | A | 6/1999 | Bender et al. |
| 6,516,733 | B1 | 2/2003 | Sauder et al. |
| 7,021,224 | B2 | 4/2006 | Mayerle et al. |
| 8,511,242 | B2 | 8/2013 | Applegate et al. |
| 8,746,159 | B2 | 6/2014 | Garner et al. |
| 9,148,992 | B2 | 10/2015 | Staeter |
| 9,179,594 | B2 | 11/2015 | Graham |
| 9,265,191 | B2 | 2/2016 | Sauder et al. |
| 9,345,189 | B2 | 5/2016 | Harmelink et al. |
| 9,360,121 | B2 | 6/2016 | Garner et al. |
| 2015/0059630 | A1 | 3/2015 | Kinzenbaw et al. |
| 2015/0334912 | A1 | 11/2015 | Sauder et al. |
| 2016/0037713 | A1 | 2/2016 | Wendte et al. |

OTHER PUBLICATIONS vSet Select website: www.precisionplanting.com/#products/vset_select/: Jul. 20, 2016; 9 pages.

*Primary Examiner* — Christopher J. Novosad
(74) *Attorney, Agent, or Firm* — Rebecca L. Henkel; Rickard K. DeMille (57) ABSTRACT

A multiple variety seed meter for multi-variety row crop planting includes a segmented sump that may have an active sump segment and an inactive sump segment. A seed switching arrangement is used to select which seed variety is available in the active sump segment for exposure to a seed disk for singulation by a seed disk for delivery onto the agricultural field while planting.

19 Claims, 10 Drawing Sheets

MULTIPLE VARIETY SEED METER WITH SEGMENTED SUMP ARRANGEMENT AND SEED SWITCHING ARRANGEMENT

FIELD OF THE INVENTION

The invention relates generally to planters and, in particular, to planters for planting multiple types or varieties of seed and a seed meter with a segmented sump arrangement and a seed switching arrangement.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. To reduce operating expenses, farm equipment is operated at relatively faster travel speeds, which reduces the amount of operating time to complete certain tasks. When operating equipment at faster travel speeds, it can be important to maintain the quality of operation and good agronomic characteristics that can be achieved while operating at relatively slower operating speeds. This can be especially difficult to accomplish during planting, which requires precise seed depth placement and spacing accuracy in order to maintain a good seed environment. Furthermore, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include ancillary row units or two separate and distinct seed meters at every row unit. Other planters allow for planting multiple varieties by feeding seeds of different varieties to seed meters at different times.

SUMMARY OF THE INVENTION

The present invention is directed to systems for row crop planting that allow for seeding or planting multiple varieties of seed while providing rapid switchover by moving seeds from an active sump segment to an inactive sump segment to control the variety of seed that is exposed to a seed disk inside the seed meter.

According to one aspect of the invention, a multiple variety seed meter is provided for multi-variety row crop planting. The seed meter includes a segmented sump that may include an active sump segment and an inactive sump segment. A seed switching arrangement is used to select which seed variety is available in the active sump segment for exposure to a seed disk for singulation for delivery onto the agricultural field while planting.

According to another aspect of the invention, a seed meter is provided for planting multiple varieties of seed in a single planting pass during row-crop planting of an agricultural field. The seed meter includes a housing that may be arranged at a row unit of a planter. The seed meter housing defines an enclosure that surrounds a housing cavity. A seed disk is arranged within the housing cavity and is configured to singulate seeds for individual delivery onto the agricultural field while planting. A segmented sump arrangement may be defined within the housing cavity. The segmented sump may include an active sump that is configured to hold seed of a first seed variety as an active seed variety, defining an active seed pool that is exposed to the seed disk for singulation. An inactive sump segment is configured to hold seed of a second seed variety as an inactive seed variety. This may define an inactive seed pool that is not exposed to the seed disk for singulation. A seed switching arrangement may move the seed of the first seed variety from the active sump segment to the inactive sump segment. In so doing, the first seed variety is converted from the active to the inactive seed variety as a new inactive seed pool. The seed switching arrangement may move the seed of the second seed variety from the inactive sump segment to the active sump segment to convert the second seed variety from the inactive to the active seed variety as a new active seed pool.

According to another aspect of the invention, the seed switching arrangement may include a sump sweeper that moves the seed of the first and second seed varieties between the active and inactive sump segments. During a seed variety switching event, the sump sweeper converts the inactive seed pool to the active seed pool by moving the inactive seed variety into the active sump segment in a first direction, which may correspond to movement toward a seed pickup region in the seed meter. The active seed pool is converted to the inactive seed pool by moving the active seed variety into the inactive sump segment in a second direction, which may correspond to movement away from the seed pickup region.

According to another aspect of the invention, the sump sweeper may include a rotor that rotates to move seed between the active and inactive seed sump segments during seed variety switching events. The rotor may be arranged to rotate through the active sump segment and inactive sump segment during the seed variety switching events. In this way, the rotor may have a rotation path that defines a swept region that occupies at least a portion of each of the active and inactive sump segments.

According to another aspect of the invention, the seed disk may rotate in a first direction within the housing cavity for singulation of the seed, and the rotor may rotate in a second, opposite, direction for moving seed between the inactive and active sump segments. An axis of rotation of the rotor may be closer to the seed pickup region than an axis of rotation of the seed disk.

According to another aspect of the invention, a sloped wall may be arranged within the housing cavity, sloping at an angle toward the seed pickup region. The rotor may include a sloped rotor face that also extends at an angle toward the seed pickup region. When the rotor is not rotating, but in a home position that defines a non-switching state of the rotor, the sloped rotor face and the sloped wall in the housing cavity collectively present a sloped surface that angles downwardly toward the seed pickup region to direct seed toward the seed pickup region.

According to another aspect of the invention, the rotor may have a rotor blade that extends away from the rotor axis of rotation to move seed between the active and inactive seed sump segments and may have a pair of rotor blades that extend in different directions from the rotor axis of rotation.

The rotor blades may extend in opposite directions so that during a one-half revolution of the rotor, one of the rotor blades moves seed from the active sump segment to the inactive sump segment and the other rotor blade does the opposite. The rotor may rotate within a rotor housing that may include a rotor housing wall. A switching opening may be defined through the rotor housing wall for moving seed between the active and inactive sump segments. When the rotor is in its home position during its non-switching state, the inactive sump segment may be defined between the rotor and the rotor housing wall.

According to another aspect of the invention, a seed evacuation port may be arranged within the inactive sump segment. An evacuating system may be configured to selectively remove seed from the inactive sump segment through the evacuation port.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
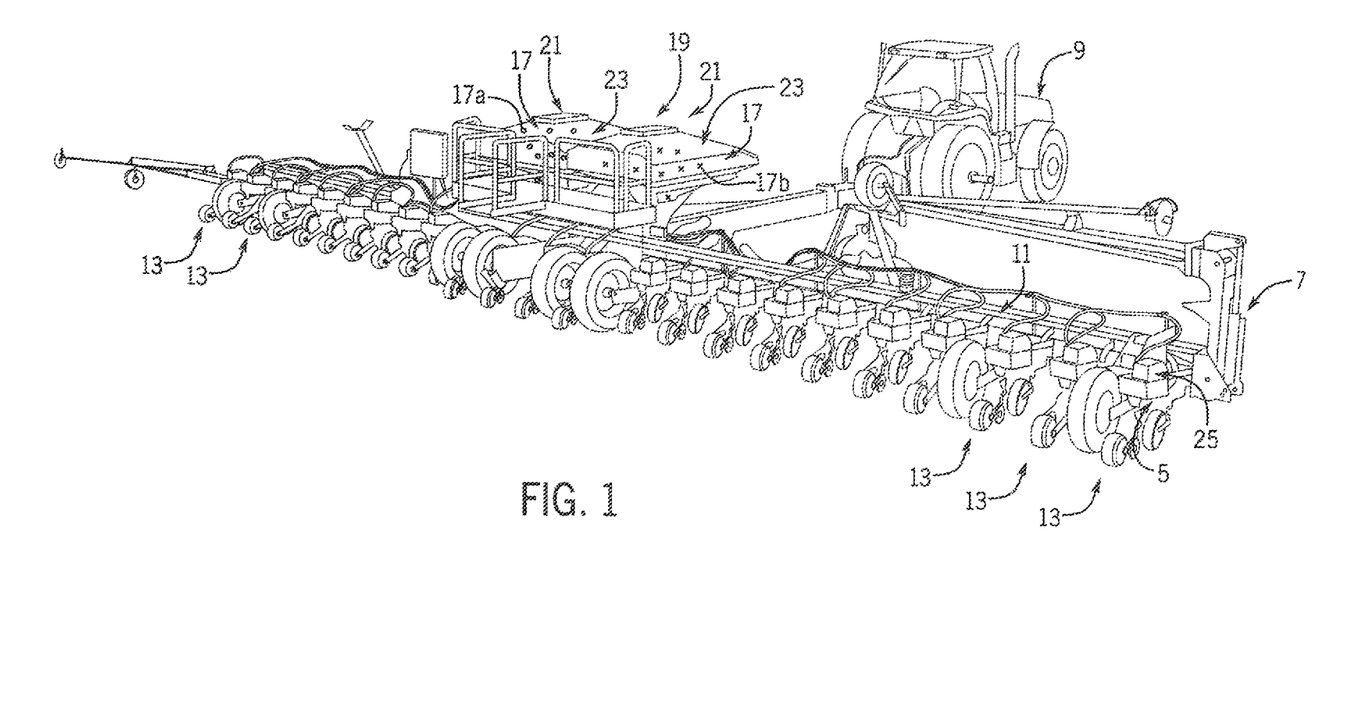
FIG. 1 is an isometric view of a planter with multiple variety seed meters in accordance with the present invention.

Referring now to the drawings and specifically to FIG. 1, a multiple variety seed meter is shown as seed meter 5, incorporated in planter 7. Seed meter 5 is configured to automatically and rapidly switch between the types or varieties of seed being delivered during planting in a single planting pass. Seed meter 5 selectively maintains both an internal active seed pool and an internal inactive seed pool while controlling which variety of seed is in the active seed pool and exposed to a seed disk of the seed meter 5 for delivery out of the seed meter 5, as explained in greater detail elsewhere herein.

Planter 7 may be one of the EARLY RISER® series planters available from Case IH and is typically pulled by a traction device such as a tractor 9. A frame 11 of the planter 7 supports multiple row units 13 that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the closed furrow and to further firm the soil over the seed to promote favorable seed-to-soil contact.

Figure 15:
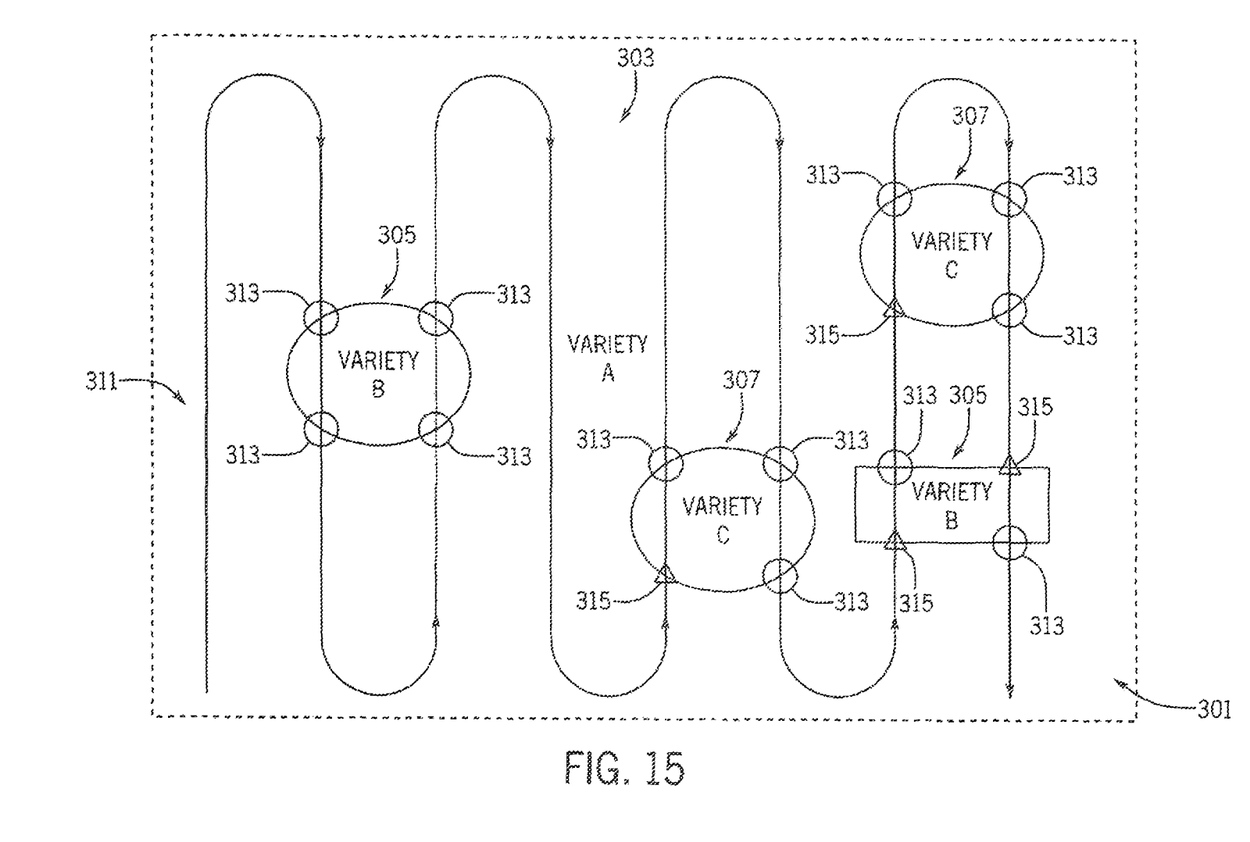
FIG. 15 is a simplified representation of a prescription map shown on a path map of multiple variety planting of a field.

Still referring to FIG. 1, seed 17 is held in a seed storage system shown here as bulk storage in a bulk storage system 19. Bulk storage system 19 has at least one bulk fill hopper 21, shown here as having two central bulk fill hoppers 21 supported by the frame 11 of the planter 7, remote from the row units 13. The bulk storage system 19 has two compartments 23, with one shown in each of the bulk fill hoppers 21. It is understood that the bulk or other storage system may have more than two compartments 23, which may correspond to the number of varieties of seeds being used for multiple type or variety planting. Additional compartments 23 may be provided in each of the bulk fill hoppers 21 by divider walls or partitions. It is understood that at least some bulk storage may be at the row units 13 themselves, such as by way of manual-fill on-row storage compartments. The different compartments 23 may hold seeds 17 of a different plant type or a common plant type but different varieties such as Variety-A and Variety-B indicated by 17a, 17b for planting in different multiple type or variety zones of an agricultural field defined at least in part by characteristics relating to at least one of soil type and management type, or other characteristics such as low/high ground areas, weed issues, insect issues, fungal issues, buffer zones in organic fields that are planted next to non-organic fields, or others, such as those represented as zones of Variety-A, Variety-B, and Variety-C in the prescription map schematically represented in the path map of FIG. 15. Although two different seed varieties 17a, 17b, are shown it is understood that other numbers of seed varieties such as a third variety as Variety-C (not shown) or others may be stored on and planted by the planter 7 based on, for example, the number of compartments 23 in the bulk storage system 19 for a particular planter 7. The simplified path representation of the prescription map represented in the path map in FIG. 15 shows one example of a planting path that is planted using three different seed varieties as Variety-A, Variety-B, and Variety-C. Although the seed 17 may be described elsewhere herein as different types or varieties, it is understood that the description of the different types or varieties of seed includes different hybrids or products. In other words, the different types or varieties 17a, 17b of seed 17 include not only different hybrids or varieties of the same plant species, but also different seed products, including seeds of different species and coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. The different seed products can further include different crop seeds such as corn and soybeans, oats, and barley, different cover crops such as tillage radishes and rye, or various combinations of these or other combinations.

Figure 2:
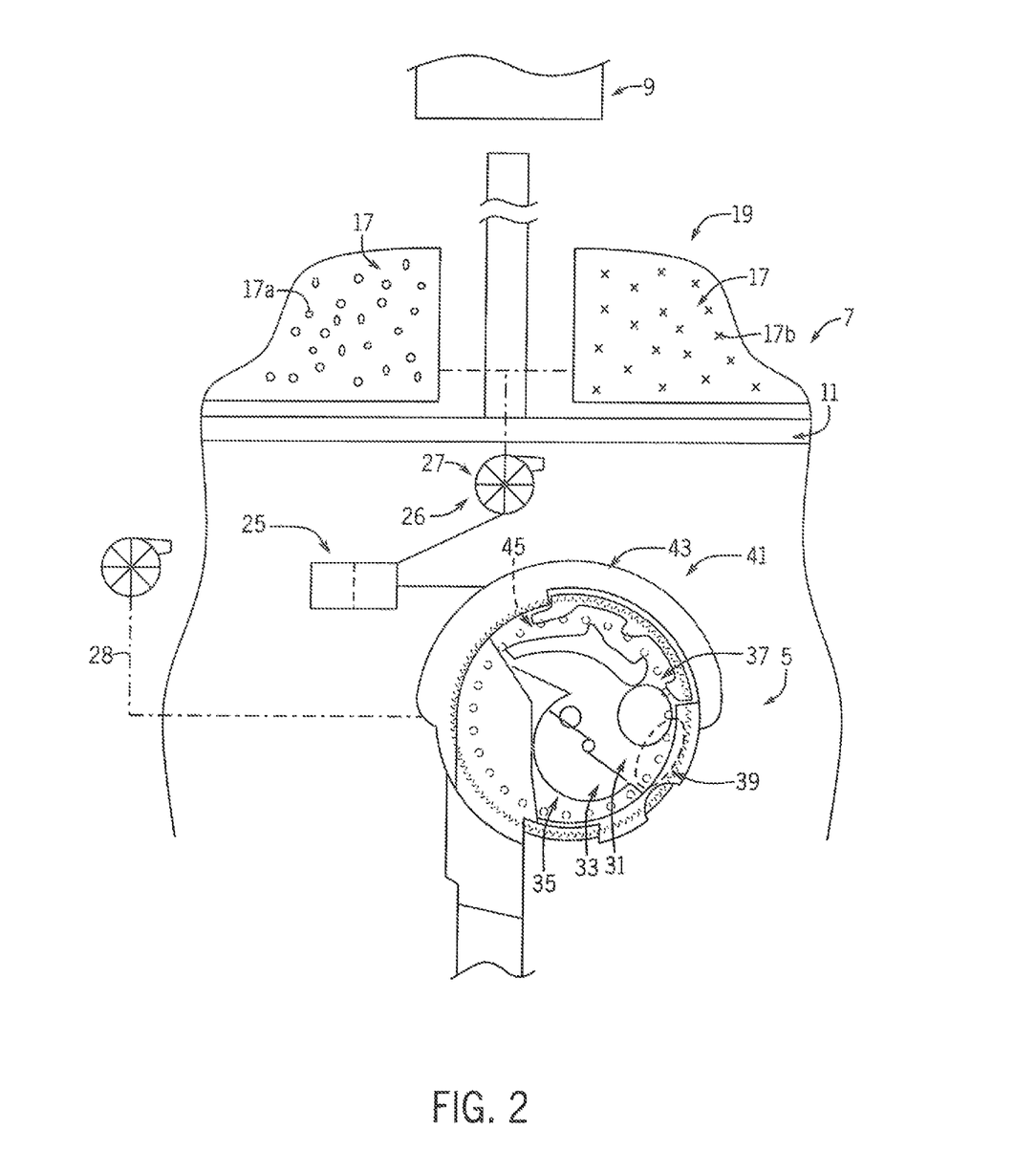
FIG. 2 is a simplified partially schematic representation of portions of the planter of FIG. 1.

Referring now to FIG. 2, planter 7 includes airflow system 26 that provides pneumatic power for use by various components of the planter 7 by way of, for example, positive air pressure source(s) and vacuum source(s) for establishing positive and/or vacuum pressures and corresponding airflows, depending on the particular configurations of the pneumatic system(s) in which they are incorporated. The positive air pressure source(s) and vacuum source(s) can be known pumps, fans, blowers, and/or other known airflow system components and include fittings, tubing, and other components to interconnect components of airflow system 26 to each other and/or components of other systems of planter 7. Airflow system 26 includes a seed conveyance airflow system 27 and a seed meter airflow system 28. Seed conveyance airflow system 27 pneumatically delivers seeds of the different varieties 17a, 17b from the bulk storage system 19 into an on-row storage system 25. Seed conveyance airflow system 27 delivers the seed 17 in an airflow that entrains the seed 17 and flows along a flow path defined by, for example, conduits that extend along the planter 7 to the row units 13 to be dropped into the seed trench formed by the furrow opening mechanism. Each row unit 13 may have more than one compartment, such as multiple compartments of a segmented mini-hopper optionally, at least one on-row bulk tank, or other separate and distinct compartments, to separately simultaneously store the different seed varieties 17a, 17b in the on-row storage system 25 that feeds seed meter 5. Seed meter airflow system 28 provides negative and/or positive pressure for operation of seed meters 5 at the row units 13, explained in greater detail elsewhere herein.

Still referring to FIG. 2, each seed meter 5 can be a purely mechanical-type seed meter 5 or a pneumatic seed meter 5. Seed meter 5 maintains multiple seed pools of multiple seed varieties inside of seed meter 5, as an active seed pool 31 and an inactive seed pool 33, explained in greater detail elsewhere herein, and includes seed switching arrangement 35 that selectively presents seeds of a certain variety 17a, 17b into the active seed 31 pool to expose those seeds to an internal seed disk 37. Seed disk 37 is rotated through at least part of the active seed pool 31 to pick up and singulate seeds using seed pockets or fingers at a seed pickup region 39. The individual seeds are moved through the seed meter 5 for individual release through a seed delivery system (not shown), which may include a seed tube, a seed delivery belt, or other seed delivery mechanism, toward a seed trench of the agricultural field. Rotation of seed disk 37 is accomplished by way of a seed disk drive system. The seed disk drive system may include, for example, various electric or hydraulic motors, drive shafts, chains and belts, clutches, peg-and-hole drive systems, and/or other arrangements such as a directly driven arrangement in which a motor directly drives the seed disk at its hub or periphery. Pneumatic seed meters 5 of negative pressure types are further operably connected through a vacuum inlet (not shown) to the seed meter airflow system 28 of airflow system 26 to provide a vacuum airflow within a vacuum chamber establishing a negative or vacuum pressure within the seed meter 5 opposite the active seed pool 31 allowing the seeds 17 to be held against the seed disk 37 such as within the seed pockets by the vacuum pressure. Pneumatic seed meters 5 of positive pressure types are operably connected through a pressurized air inlet (not shown) to the seed meter airflow system 28 to provide a positive airflow and a corresponding positive pressure at the seed side of the seed disk 37 within the seed meter 5, whereby seeds from the active seed pool 31 are pushed and held against the seed disk 37, such as within the seed pockets, by positive pressure. Seed meter airflow system 28 of either negative or positive pressure type seed meters may provide negative pressure to an evacuating system for extracting or evacuating seed from inactive seed pool 33 and returning the extracted or evacuated seed to storage outside of seed meter 5, explained in greater detail elsewhere herein.

Still referring to FIG. 2, seed meter 5 includes a housing 41 with first and second side portions or covers, one of which is removed to provide the view of FIG. 2. The side portions or covers connect to each other at their peripheries defined by respective circumferential side walls with the open ends facing toward each other to collectively define an enclosure 43 that surrounds housing cavity 45 in which seed disk 37 is at least partially arranged for rotation. Although seed disk 37 is shown in FIG. 2 as entirely enclosed within housing 41 and its housing cavity 45, it is understood that at least a portion of seed disk 37 may extend out of the housing 41 and its housing cavity 45. Other components may be arranged within the housing cavity 45, such as various seals that engage seed disk 37 to provide vacuum shutoff or positive pressure isolation and a seed singulator that is configured to inhibit more than one seed from being discharged from the seed meter 5 per seed discharge event. A brush assembly may be arranged within the housing cavity 45 to form a barrier that retains the seed 17 inside the housing cavity 45 instead of, for example, spilling out of the meter through the seed delivery system.

Figure 3:
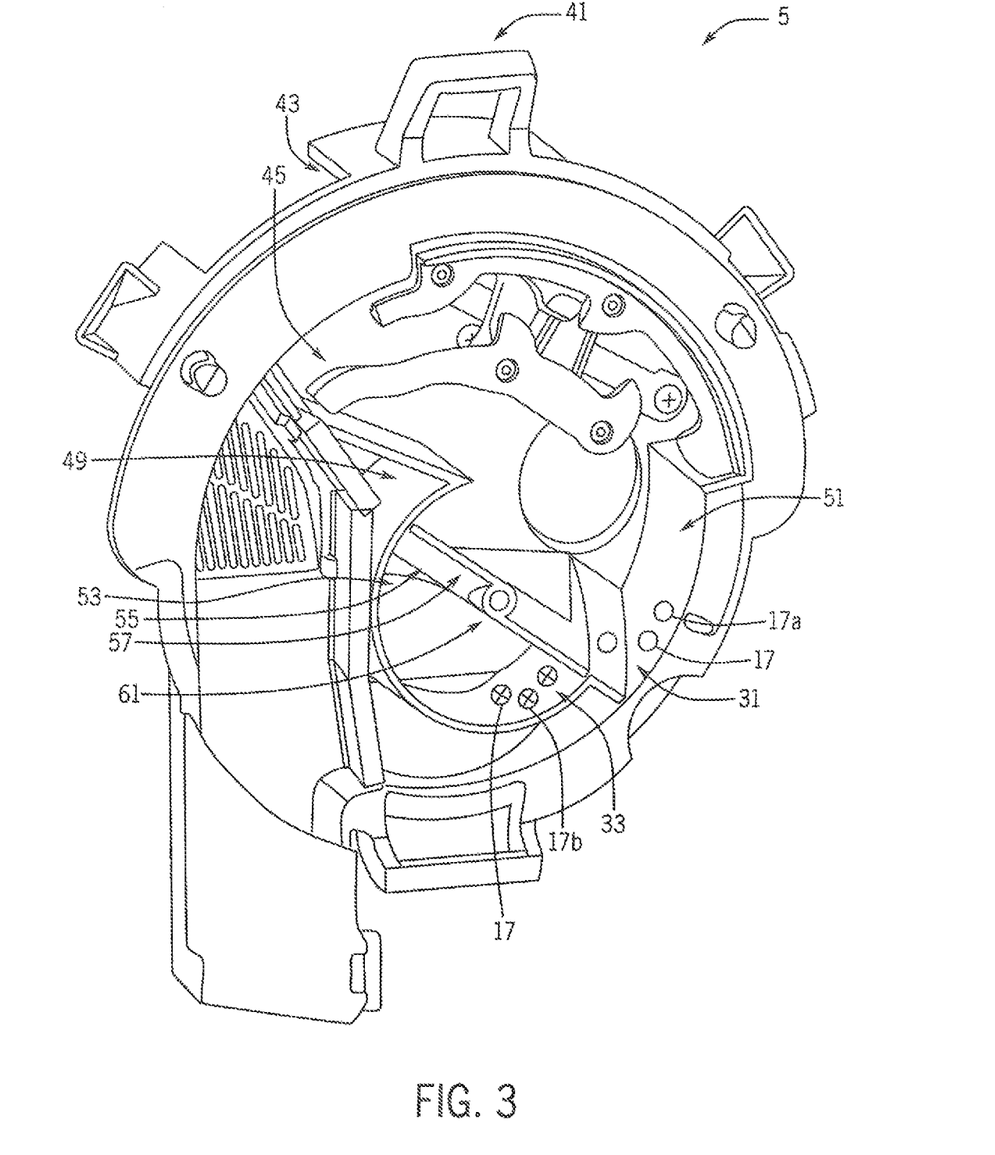
FIG. 3 is a pictorial view of portions of a multiple variety seed meter of the planter of FIG. 1.

Referring now to FIG. 3, a segmented sump arrangement 49 is defined within housing cavity 45 and includes active sump segment 51 and inactive sump segment 53 that respectively hold the active and inactive seed pool 31, 33. Seeds 17 in active seed pool 31 within active sump segment 51 define an active seed variety that is exposed to seed disk 37 (FIG. 2) to be singulated and carried through seed meter 5. Seeds 17 of the inactive seed pool 33 within inactive sump segment 53 define an inactive seed variety, which is not exposed to seed disk 37 for singulation. A seed switching arrangement 55 selectively moves seed of different varieties between active and inactive sump segments 51, 53 to change which variety provides the active seed pool 31 for planting at that time. In so doing, seed switching arrangement 55 can move a first seed variety such as seed variety 17a from the active seed pool 31 in the active sump segment 51 to the inactive seed pool 33 in the inactive sump segment 53, converting the first seed variety 17a from the active to the inactive seed variety. Seed switching arrangement 55 can also move a second seed variety such as seed variety 17b from the inactive seed pool 33 in the inactive sump segment 53 to the active seed pool 31 in the active sump segment 51, converting the second seed variety 17b from the inactive to the active seed variety. Seed switching arrangement 55 can continue this process to provide further switching back and forth between the active and inactive seed varieties in the active and inactive seed pool 31, 33, optionally introducing a third or higher number seed variety, as described in greater detail elsewhere herein.

Still referring to FIG. 3, seed switching arrangement 55 may include a sump sweeper 57 that moves the seed 17 between the active and inactive sump segments 51, 53. During a seed variety switching event, the sump sweeper 57 moves seed 17 in the active sump segment 51 in a first direction away from seed pickup region 39 (FIG. 2) and into the inactive sump segment 53, converting the seed from an active seed variety to an inactive seed variety. The opposite is done with seed 17 of the inactive variety to move it toward the seed pickup region 39 (FIG. 2) in the active sump segment 51, converting it to the active seed variety. Sump sweeper 57 may include rotor 61 that rotates to move seed 17 between the active and inactive seed sump segment 51, 53 during seed variety switching events. Rotor 61 may be arranged to rotate through at least a portion of the active and inactive sump segments 51, 53 during the seed variety switching events so that a rotation path of rotor 61 defines a swept region that occupies at least a portion of each of the active and inactive sump segments 51, 53. Rotor 61 may rotate about its axis of rotation in an opposite direction than a rotation direction of seed disk 37 (FIG. 2) about its axis rotation and the axis of rotation of rotor 61 may be closer to seed pickup region 39 (FIG. 2) than the axis of rotation of seed disk 37 (FIG. 2). This allows the seed variety switching activity to occur near where seed is carried out of active seed pool 31 to efficiently switch the variety of seed presented to seed disk 37 (FIG. 2).

Figure 4:
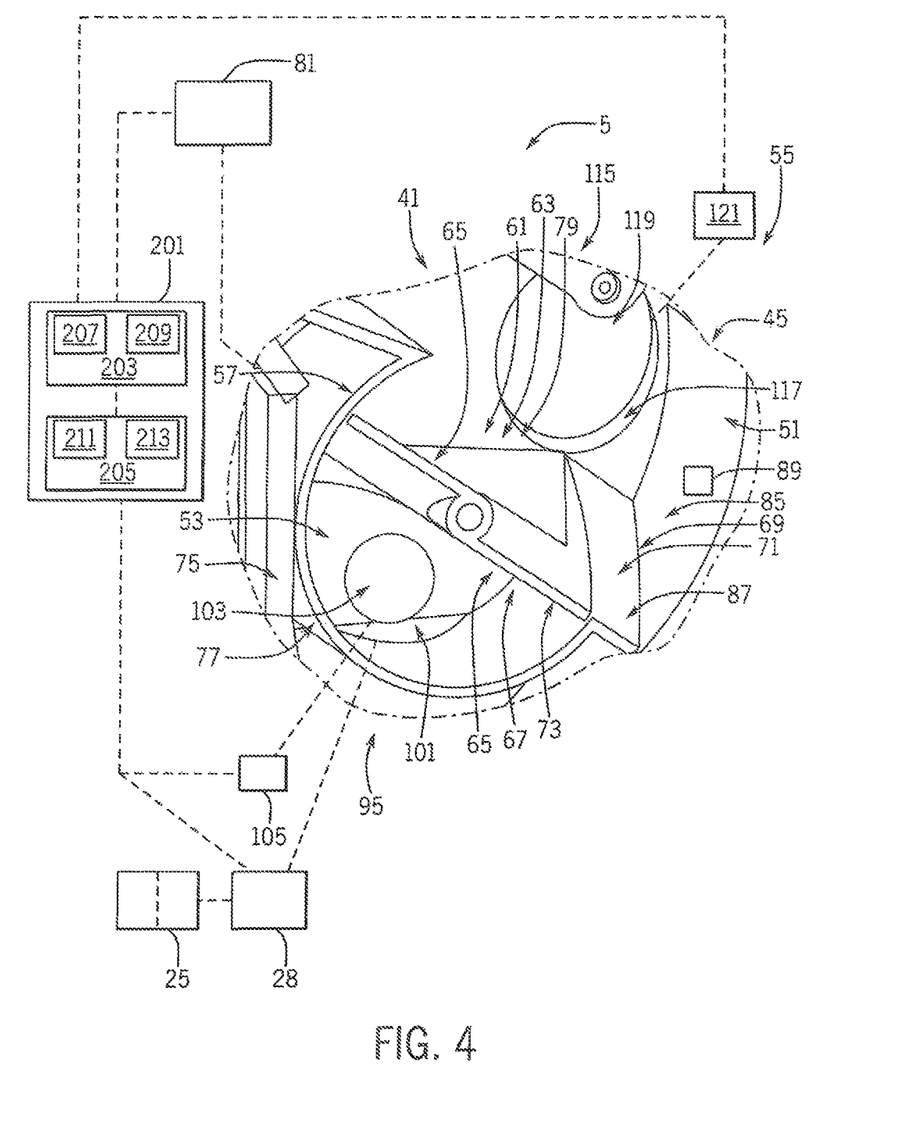
FIG. 4 is an enlarged pictorial view of portions of a multiple variety seed meter of the planter of FIG. 1.

Referring now to FIG. 4, rotor 61 had a rotor body 63 with at least one blade 65 that rotates around the axis of rotation, shown here with a pair of blades 65 that extend in opposite directions from a middle portion of rotor body 63 near the axis of rotation. Blades 65 have widths that correspond to a width of the housing cavity 45 (FIG. 2) between the back wall of housing 41 and seed disk 37 (FIG. 2) and includes various segments and features, many of which are only labeled on the more visible blade 65 shown extending to the right but are also on the other blade 65 shown extending to the left. Each blade 65 includes an inner blade segment 67 that extends radially outward from the middle portion of rotor body 63. Outer blade segment 69 extends from an outer end of inner blade segment 67, shown here extending angularly from the outer end of inner blade segment 67 like an elongate barb providing a checkmark-type perimeter shape to each blade 65 when viewed in an end view. A front side of rotor 61 that faces toward seed disk 37 (FIG. 2) has a sloped rotor face 71. Sloped rotor face 71 angles from a lower blade edge 73 closest to seed disk 37 (FIG. 2) rearwardly away from seed disk 37 (FIG. 2), toward the back wall of housing 41.

Still referring to FIG. 4, rotor 61 may be arranged to rotate within a rotor housing 75 inside of housing cavity 45, shown here as providing a generally horizontal cylindrical configuration to sump sweeper 55. Rotor housing 75 is shown here with rotor housing wall 77 that defines a circumferential side wall of rotor housing 75. Rotor housing wall 77 extends about most of a perimeter of the swept region of rotor 61, with a break in the rotor housing wall 77 that defines switching opening 79 through which seeds 17 (FIG. 3) move during seed variety switching events, between the active and inactive sump segments 51, 53. Rotor drive system 81 drives rotation of rotor 61 within rotor housing 75. Rotor drive system 81 includes a drive such as a motor which may be an electric, pneumatic, or hydraulic motor that may directly drive the rotor 61 or may instead drive an intermediate component(s) such as a gear-train or other transmission mechanism between the drive and rotor 61. When rotor drive system 81 rotates rotor 61 within rotor housing 75, the rotor 61 defines a switching state and actively moves seed 17 between the active and inactive sump segments 51, 53, for example, by simultaneously exchanging the respective seed pools or substantially all of the seed in the respective seed pools. When rotor drive system 81 is not driving rotation of rotor 61, the rotor is held in a home position and defines a non-switching state. When in the non-switching state in its home position, rotor 61 provides a transverse barrier between the active and inactive sump segments 51, 53, with the inactive sump segment 53 between the rotor 61 and rotor housing wall 77. Sloped wall 85 is arranged within housing cavity 45, sloping downwardly away from the back wall of housing 41 at an angle toward seed pickup region 39 (FIG. 2). A bottom portion of sloped wall 85 and an adjacent portion of a sidewall of cover 41 may define a collection area 87 of active sump segment 51 that is transversely adjacent and outside of the swept region of rotor 61. Collection area 87 may hold a relatively small numbers of seed to maintain at least some seed in the active seed pool 31 during switching events and avoid skips during the switching events. The angle of sloped wall 85 is shown here matching that of sloped rotor face 71 so that when rotor 61 is in its home position, sloped rotor face 71 and sloped wall 85 are substantially coplanar and collectively present a sloped surface sloping at an angle toward seed pickup region 39 (FIG. 2) to direct seed 17 (FIG. 2) toward the seed pickup region 39 (FIG. 2).

Still referring to FIG. 4, evacuating system 95 allows planter 7 (FIG. 1) to switch between more than two varieties of seed 17 by evacuating seed 17 from the segmented sump arrangement 49 (FIG. 3). Evacuating system 95 operably connects a vacuum source of airflow system 26, shown here as a vacuum source of seed meter airflow system 28, to a hose or other conduit(s) that extends between on-row storage system 25 and evacuation port 101. Evacuation port 101 is shown extending through the back wall of housing 41, presenting an opening in a lower section of inactive sump segment 53 for withdrawing seed 17 (FIG. 3) from inactive seed pool 33 (FIG. 3). Evacuation port gate 103 is selectively moved by evacuation port gate actuator 105 to open or close the opening at evacuation port 101 for selectively allowing seed 17 (FIG. 3) to flow through the evacuation port 101 to return to storage in on-row storage system 25 or other storage outside of seed meter 5. Seed meter inlet system 115 allows planter 7 (FIG. 1) to selectively stop feeding seed 17 into seed meter 5. Seed meter inlet system 115 is shown here with a seed meter inlet port 117 that extends through the back wall of housing 41, presenting an opening that delivers seed 17 (FIG. 3) into active sump segment 51. Seed meter inlet port gate 119 is selectively moved by seed meter inlet port gate actuator 121 to open or close the opening at seed meter inlet port 117 for selectively allowing seed 17 (FIG. 3) to flow through the seed meter inlet port 117 into active sump segment 51. Each of evacuation and seed meter inlet port gate actuators 105, 121 can be, for example, an electromechanical actuator such as a solenoid-based linear actuator or other actuator capable of sliding or rotating the evacuation and seed meter inlet port gates 103, 119 to open or close the respective evacuation and seed meter inlet ports 101, 117 as controlled, along with rotor drive system 81, by control system 201.

Referring now to FIGS. 4 and 15, control system 201 includes tractor control system 203 and planter control system 205 that operably communicate with each other, for example, by way of an ISOBUS connection, for coordinating controls of tractor 9 (FIG. 1) and planter 7 (FIG. 1), including which seed variety(ies) 17a, 17b are delivered, based on the type or variety zones Variety-A, Variety-B, Variety-C of the agricultural field. Variety zones Variety-A, Variety-B, Variety-C may correspond to a seed type or variety prescription map PM as schematically represented in the path map shown in FIG. 15. In FIG. 4, tractor control system 203 is shown having a tractor controller 207 and power supply 209, and planter control system 205 is shown having a planter controller 211 and power supply 213. Each of the tractor and planter controllers 207, 211 can include an industrial computer or, e.g., a programmable logic controller (PLC), along with corresponding software and suitable memory for storing such software and hardware, including interconnecting conductors for power and signal transmission for controlling respective electronic, electro-mechanical, hydraulic, and pneumatic components of the tractor 9 and planter 7. Tractor controller 207 is configured for controlling the functions of the tractor 9 by controlling, e.g., steering, speed, braking, shifting, and other operations of the tractor, which may include controlling various GPS steering or other GPS-related systems, transmission, engine, hydraulic, and/or other systems of the tractor 9. A tractor interface system is operably connected to the tractor controller 207 and includes a monitor and various input devices to allow an operator to see the statuses and to control various operations of the tractor 9 from within the cab of the tractor 9. The tractor interface system may be a MultiControl Armrest™ console available for use with the Maxxum™ series tractors from Case IH. Planter controller 211 is configured for controlling the functions of planter 7 by controlling, e.g., product conveyance along the planter 7, seed 17 variety delivery selection, and seed delivery out of planter 7 to the field. This may include controlling the positive pressure and vacuum pumps and/or other vacuum sources, as well as fans, blowers, actuators, and other components of seed conveyance and seed meter airflow systems 27, 28, as well as controlling other characteristics of seed meter 5 such as adjusting singulator and baffle settings by way of controlling corresponding solenoids, stepper motors, or the like. Planter controller 211 also controls seed switching arrangement 55 by sensing various states and delivering control signals to automatically control the variety of seed that is in and delivered to active seed pool 31 (FIG. 3) by controlling seed conveyance airflow system 27, rotor drive system 81, and evacuation and seed meter inlet port gate actuators 105, 121 to selectively permit exposure of one(s) of the seed varieties 17a, 17b to seed disk 37 based on the type or variety zones Variety-A, Variety-B, and Variety-C in the prescription map schematically represented in the path map of FIG. 15. During use, control system 201 can determine planter position, speed, heading, and/or other movement characteristics by way of monitoring tractor position and movement through the tractor controller 207. Tractor controller 207 may evaluate, for example, a speed input signal from a tractor speed sensor along with a GPS signal or data from tractor GPS with respect to the prescription map. Using such evaluations, control system 201 determines which row units 13 should plant which seed variety(ies) 17a, 17b and when, to achieve such multi-seed variety planting. The planter controller 211 commands delivery of the appropriate seed variety to seed meter 5 and, within seed meter 5, commands selective presentation of the appropriate seed variety 17a, 17b as the active seed variety in the active seed pool 31 to plant a specific variety.

Referring generally to FIGS. 5-14 and with further reference to FIG. 15, simplified versions of segmented sump arrangement 49 and seed switching arrangement 55 are shown to illustrate an example of switching back and forth between planting first and second seed varieties 17a, 17b, as controlled by control system 201 (FIG. 4). Referring now to FIG. 15, a path map is shown with a simplified schematic representation of a prescription map of field 301 showing three zones of Variety-A, Variety-B, and Variety-C respectively shown as zones 303, 305, 307 for receiving three different varieties of seed 17a, 17b, 17c (not shown). Tractor 9 (FIG. 1) and planter 7 (FIG. 1) travel along path 311 through field 301 while traveling through the Variety-A, Variety-B, and Variety-C zones 303, 305, 307. Seed variety switching events are shown as labeled circles and triangles. Switching events that implicate only two varieties and do not require seed evacuation are represented by the circles as two-seed switching events 313 that may provide back and forth type switching between two varieties. Switching events that implicate more than two varieties and require seed evacuation are represented by the triangles as evacuating-seed switching events 315.

Figure 5:
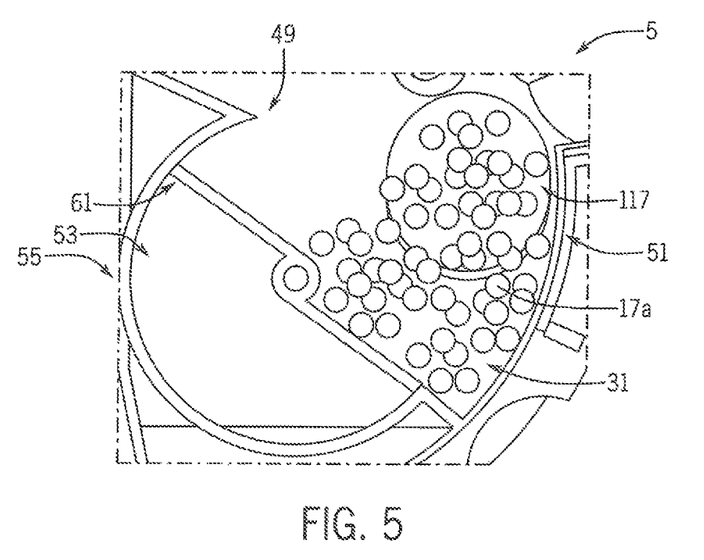
FIGS. 5-14 are simplified side elevation views of portions of a multiple variety seed meter of the planter of FIG. 1 in different stages of seed variety switching events.

FIG. 5 represents a steady-state planting of a first variety 17a of Variety-A zone 303 (FIG. 15) at initial planting which may occur at the beginning of path 311 (FIG. 15). During this initial steady-state planting, rotor 61 is held in its home position and seed meter inlet port gate 119 (FIG. 5) is held in a position that uncovers or opens seed meter inlet port 117. During this initial steady-state planting, the first seed variety 17a continues to feed the active seed pool 31 in active sump segment 51 while inactive sump segment 53 remains empty, if it was empty before planting started.

Figure 6:
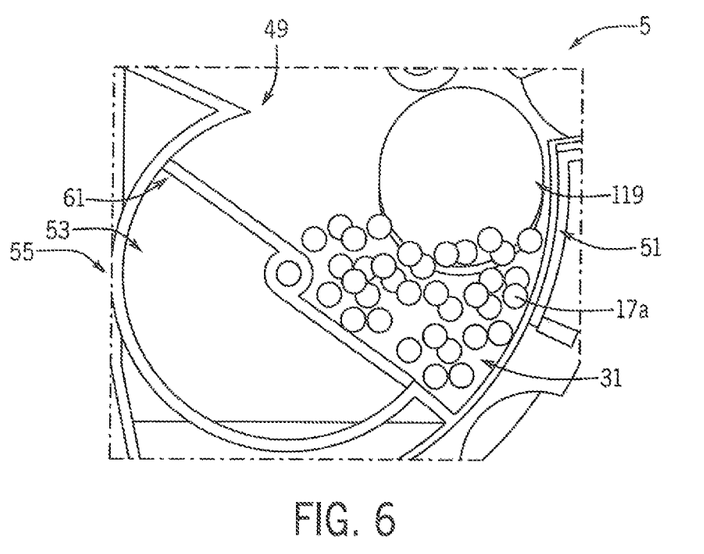

FIG. 6 represents preparation for switching to a second variety 17b of Variety-B zone 305 (FIG. 15) for the first time during the planting session, for example, when the planter 7 (FIG. 7) is a predetermined distance or time from the first-to-be-encountered seed switching event 313 (FIG. 15). The predetermined distance or time may correspond to known values for how far or how much time is required to effectively switch from variety A to variety B. During this initial switching preparation, rotor 61 is held in its home position, and seed meter inlet port gate 119 is moved to a position that covers or closes seed meter inlet port 117 (FIG. 5). During this switching preparation, seed meter 5 continues to plant the first variety 17a while approaching the location of seed switching event 313 (FIG. 15) and while the second seed variety 17b is delivered toward the closed seed meter inlet port 117 (FIG. 5).

Figure 7:
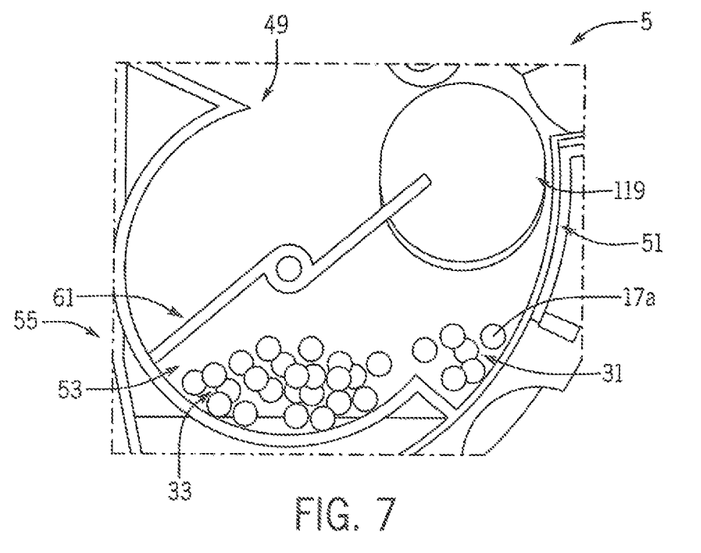

FIG. 7 represents the beginning of active switching to the second variety 17b by rotating rotor 61 through its swept region while seed meter inlet port gate 119 is held covering or closing seed meter inlet port 117 (FIG. 5). During this rotation, rotor 61 pulls most of seed variety 17a out of active sump 51, while leaving a small amount in collection area 87 (FIG. 4) to be removed from seed pickup region 39 (FIG. 2) during continued rotation of seed disk 37 (FIG. 2) to prevent skips and maintain continuous planting while switching varieties.

Figure 8:
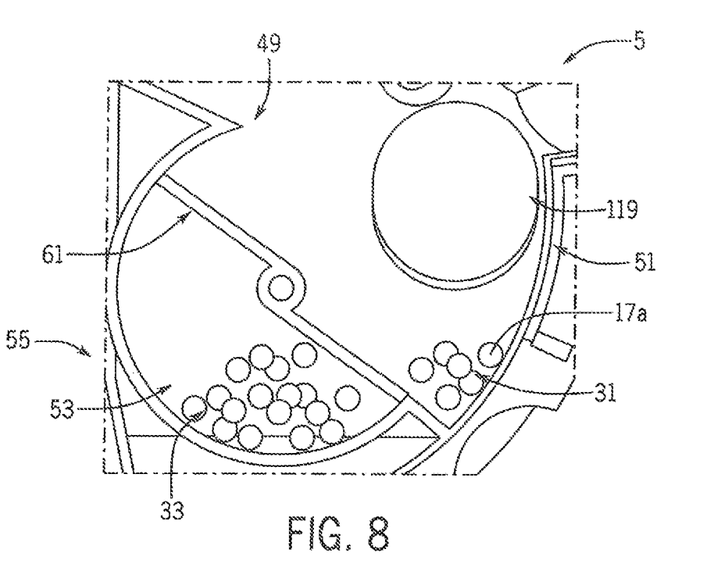

FIG. 8 represents stopping rotation of rotor 61 in its home position after a one-half revolution. At this point, most of the first variety 17a is behind rotor 61 in sump segment 53 and defines an inactive seed pool 33. Residual seeds 17 of the first variety 17a remain in collection area 87 (FIG. 4) of active sump segment 51 to maintain continuous planting before a next variety is introduced. The continuous planting of first variety 17a in collection area 87 (FIG. 4) continues until it reaches an acceptably low level. A sensor such as seed level sensor 89 (FIG. 4) that operably communicates with control system 201 (FIG. 4) could be used to determine when the seed level has reduced to an acceptably low level, or determination of an acceptably low seed level could be based on predictive algorithms based on seed type and planting rate.

Figure 9:
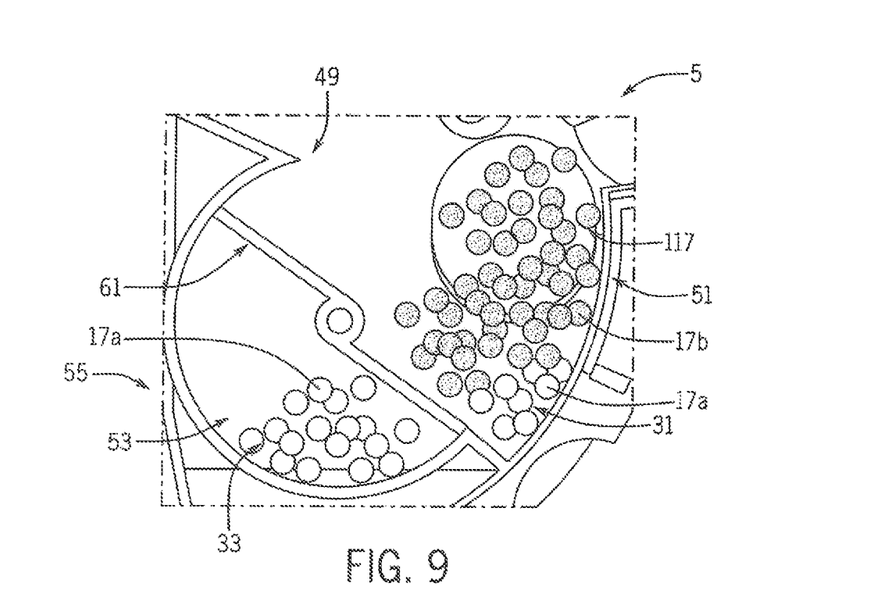

FIG. 9 represents the introduction of the second variety 17b after the first variety in collection area 87 (FIG. 4) reaches the acceptably low level. When this state is detected, seed meter inlet port gate 119 (FIG. 8) is moved to a position that uncovers or opens seed meter inlet port 117. With seed meter inlet port 117 open, the second variety 17b flows through the seed meter inlet port 117 and into the active sump segment 51. At this point, the active seed pool 31 is a mixture of the newly introduced second variety 17b and the remaining first variety 17a. This mixture is planted until all of the remaining first variety 17a is removed from the active sump segment 51.

Figure 10:
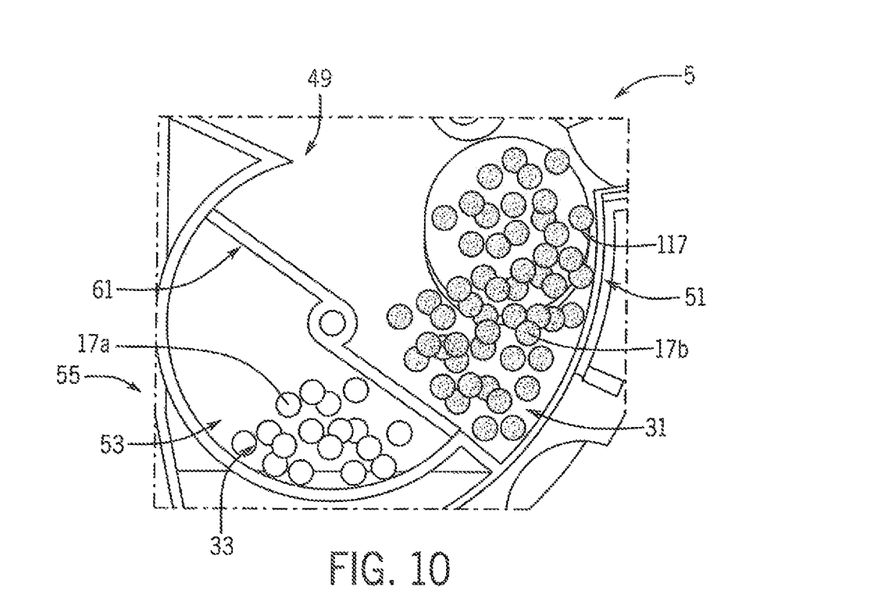

FIG. 10 represents a steady-state planting of the second variety 17b of Variety-B zone 305 (FIG. 15) after the remaining first variety 17a was planted out from the mixed active seed pool 31 and the active seed pool 31 is only the second variety 17b with additional seed of the second variety 17b being fed to it. During this steady-state planting, rotor 61 is held in its home position and seed meter inlet port gate 119 (FIG. 8) is held to keep the seed meter inlet 117 uncovered or open. During this steady-state planting, the second seed variety 17b continues to feed the active seed pool 31 in active sump segment 51 while inactive sump segment 53 continues to hold the first variety 17a in the inactive seed pool 33.

Figure 11:
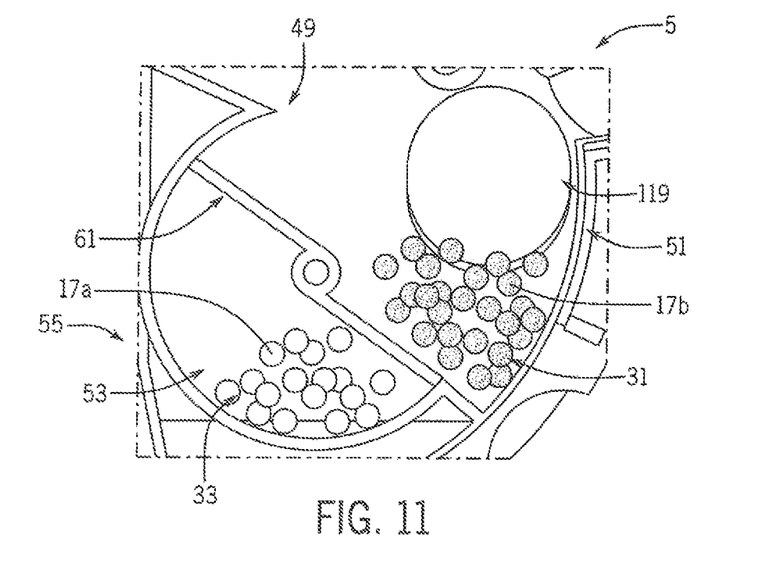

FIG. 11 represents preparation for switching back from second variety 17b of Variety-B zone 305 (FIG. 15) to the first variety 17a of Variety-A zone 303, which may occur when the planter 7 (FIG. 7) is a predetermined distance or time from the seed switching event 313 (FIG. 15) at the exit of Variety-B zone 305. Like with the initial switching preparation shown in FIG. 6, rotor 61 is held in its home position and seed meter inlet port gate 119 is moved to cover or close seed meter inlet port 117 (FIG. 10). Seed meter 5 continues to plant the second variety 17b while approaching the location of seed switching event 313 (FIG. 15) at the exit of Variety-B zone 305 and while the first seed variety 17a is delivered toward the closed seed meter inlet port 117 (FIG. 10).

Figure 12:
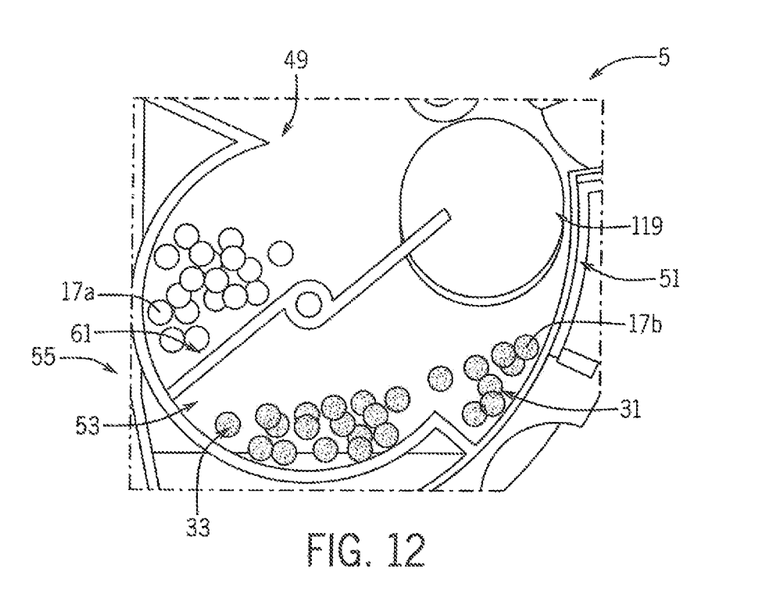

FIG. 12 represents the beginning of active switching back to the first variety 17a by rotating rotor 61 through its swept region while seed meter inlet port gate 119 is held covering or closing seed meter inlet port 117 (FIG. 10). During this rotation, rotor 61 pulls most of seed variety 17b out of active sump 51, while leaving a small amount in collection area 87 (FIG. 4) to be removed from seed pickup region 39 (FIG. 2) during continued rotation of seed disk 37 (FIG. 2) to prevent skips and maintain continuous planting while switching varieties.

Figure 13:
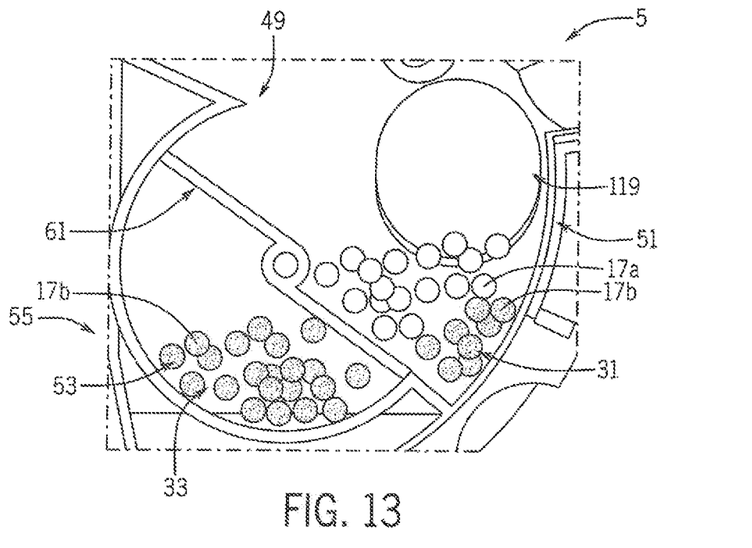

FIG. 13 represents stopping rotation of rotor 61 in its home potion after a one-half revolution. At this point, most of the second variety 17b is behind rotor 61 in sump segment 53 and defines the inactive seed pool 33. Residual seeds 17 of the second variety 17b remain in collection area 87 (FIG. 4) while the first variety 17a is swept out of inactive sump segment 53 and reintroduced into active sump segment 51, providing a mixed active seed pool 31 in active sump segment 51 to maintain continuous planting before the next variety is introduced.

Figure 14:
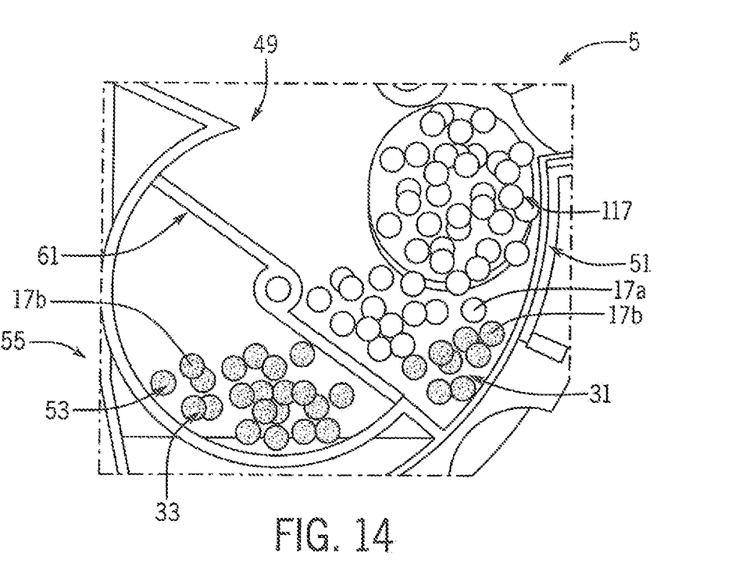

Referring now to FIG. 14, seed meter inlet port gate 119 (FIG. 13) is moved to uncover or open seed meter inlet port 117. This is shown without waiting for a certain low seed level in active seed pool 31, although it is understood that such waiting for a detected low seed level may be done, similar to as described with respect to FIG. 8. With seed meter inlet port 117 open, the first variety 17a flows through the seed meter inlet port 117 and into the active sump segment 51. At this point, the mixed active seed pool 31 gains more of the first variety 17a, and the mixture is planted until all of the remaining second variety 17b is removed from the active sump segment 51. At that point, seed meter 5 is again in a steady-state of planting the first variety 17a, similar to what is shown in FIG. 5 only with the second variety 17b held in the inactive sump segment 53 as an inactive seed pool 33.

The above process is repeated to achieve back-and-forth type switching of two seed varieties. If more than two varieties are used, and if the next variety to be planted is not the same as the previous variety, then the variety in the inactive sump segment 53 is removed by evacuating system 95 (FIG. 4) to draw the unneeded variety out of evacuation port 101 (FIG. 4) for storage outside of seed meter 5, such as at on-row storage system 25 (FIG. 2). This emptying of the inactive sump segment 53 resets the seed meter 5 to the state shown at FIG. 5. At that point, a third or higher number variety may be introduced as a new variety into active sump segment 51 until a steady-state is achieved for planting the new variety, as described above with respect to FIGS. 5-10.

Many changes and modifications could be made to the invention without departing from the spirit thereof. Various components and features of the system 5, for example, components, or features of the seed storage system(s), charging system(s), and seed metering system(s) can be incorporated alone or in different combinations on a planter. The scope of these changes will become apparent from the appended claims.

We claim:

1. A multiple variety seed meter for planting multiple varieties of seed in a single planting pass during row-crop planting of an agricultural field, the seed meter comprising:
   a housing arranged at a row unit of a planter and defining an enclosure that surrounds a housing cavity;
   a seed disk arranged at least partially within the housing cavity and configured for singulation of seeds for individual delivery onto the agricultural field while planting;
   a segmented sump arrangement defined within the housing cavity, the segmented sump arrangement including,
      an active sump segment configured to hold seed of a first seed variety as an active seed variety to define an active seed pool that is exposed to the seed disk for singulation;
      an inactive sump segment configured to hold seed of a second seed variety as an inactive seed variety to define an inactive seed pool that is not exposed to the seed disk for singulation;
   a seed input port arranged within the active sump segment for selectively supplying one of the seed of the first seed variety and the seed of the second seed variety to the active sump segment through the seed input port; and
   a seed switching arrangement that,
      moves the seed of the first seed variety from the active sump segment to the inactive sump segment, whereby the first seed variety is converted from the active seed variety in the active seed pool to the inactive seed variety to define the inactive seed pool; and
      moves the seed of the second seed variety from the inactive sump segment to the active sump segment, whereby the second seed variety is converted from the inactive seed variety in the inactive seed pool to the active seed variety to define the active seed pool.

2. The multiple variety seed meter of claim 1, wherein the seed switching arrangement comprises a sump sweeper that is movable for moving the seed of the first and second seed varieties between the active and inactive sump segments.

3. The multiple variety seed meter of claim 1, wherein, during a seed variety switching event, the sump sweeper:

converts the inactive seed pool to the active seed pool by moving the inactive seed variety into the active sump segment in a first direction; and converts the active seed pool to the inactive seed pool by moving the active seed variety into the inactive sump segment in a second direction.

4. The multiple variety seed meter of claim 3, wherein a seed pickup region is defined in the housing cavity at a location at which the seed disk picks up seed from the active sump segment, and wherein first direction corresponds to a direction of movement of seed toward the seed pickup region and the second direction corresponds to a direction of movement of seed away from the seed pickup region.

5. The multiple variety seed meter of claim 3, wherein the sump sweeper comprises a rotor that, during a seed variety switching event, rotates to move seed between the active and inactive seed sump segments.

6. The multiple variety seed meter of claim 3, wherein the sump sweeper comprises a rotor arranged to rotate through the active sump segment and inactive sump segment during a seed variety switching event so that a rotation path of the rotor defines a swept region that occupies at least a portion of each of the active and inactive sump segments.

7. The multiple variety seed meter of claim 6, wherein the seed disk rotates in a first direction within the housing cavity for singulation of the seed and the rotor rotates in a second, opposite, direction for moving seed between the inactive and active sump segments.

8. The multiple variety seed meter of claim 7, wherein a seed pickup region is defined in the housing cavity as a location at which the seed disk picks up seed from the active sump and the seed disk rotates about a seed disk axis of rotation while picking up seeds from the seed pickup region and wherein the rotor rotates about a rotor axis of rotation with the rotor axis of rotation arranged closer to the seed pickup region than the seed disk axis of rotation.

9. The multiple variety seed meter of claim 8, further comprising a sloped wall arranged within the housing cavity at an angle toward the seed pickup region and the rotor includes a sloped rotor face that extents at an angle toward the seed pickup region so that when the rotor is in a home position to define a non-switching state of the rotor, the sloped rotor face and the sloped wall collectively present a sloped surface that angles downwardly toward the seed pickup region.

10. The multiple variety seed meter of claim 6, wherein the rotor comprises a rotor blade that extends away from an axis of rotation of the rotor to move seed between the active and inactive seed sump segments.

11. The multiple variety seed meter of claim 10, wherein the rotor blade is a first rotor blade that extends away from the axis of rotation of the rotor in a first direction, the rotor further comprises a second rotor blade that extends away from the axis of rotation of the rotor in a second direction.

12. The multiple variety seed meter of claim 11, wherein the first and second directions along which the first and second rotor blades extend away from the axis rotation of the rotor are opposite each other so that during a one-half revolution of the rotor, one of the first and second rotor blades moves seed from the active sump segment to the inactive sump segment and the other one the first and second rotor blades move seed from the inactive sump segment to the active sump segment.

13. The multiple variety seed meter of claim 6, further comprising an evacuating system configured to selectively remove seed from the segmented sump arrangement with the evacuating system including a seed evacuation port arranged within the inactive sump segment for removal of seed from the inactive sump segment through the seed evacuation port.

14. A multiple variety seed meter for planting multiple varieties of seed in a single planting pass during row-crop planting of an agricultural field, the seed meter comprising:
a housing arranged at a row unit of a planter and defining an enclosure that surrounds a housing cavity;
a seed disk arranged at least partially within the housing cavity and configured for singulation of seeds for individual delivery onto the agricultural field while planting;
a seed pickup region defined in the housing cavity as a location at which the seed disk picks up seed from a seed pool for singulation of seeds for individual delivery onto the agricultural field while planting;
a seed input port arranged in communication with the seed pool in the cavity for selectively supplying one of seed of a first seed variety and seed of a second seed variety to the seed pool;
a sump sweeper arranged within the housing cavity and configured to selectively sweep at least some of the seed out of the seed pool into a temporary storage area of the seed meter, the sump sweeper being configured to selectively isolate the temporary storage area from the seed pick up region.

15. The multiple variety seed meter of claim 14, further comprising:
a segmented sump arrangement defined within the housing cavity, the segmented sump arrangement including,
an active sump segment configured to hold seed in an active seed pool within the housing cavity for exposure to the seed disk for singulation
an inactive sump segment defining the temporary storage area and configured to hold seed in an inactive seed pool within the housing cavity to block exposure to the seed disk for singulation; and
wherein the sump sweeper comprises a rotor arranged from rotation through at least portions of the active and inactive sump segments for moving seed between the active and inactive sump segments.

16. The multiple variety seed meter of claim 15, further comprising a seed evacuation port arranged within the inactive sump segment for selectively removing seed from the inactive sump segment.

17. The multiple variety seed meter of claim 15, further comprising a rotor housing arranged within the housing cavity and having a rotor housing wall with a switching opening defined through the rotor housing wall for moving seed between the active and inactive sump segments, and wherein the rotor is arranged for rotation within the rotor housing so that when the rotor is in a home position to define a non-switching state of the rotor, the inactive sump segment is defined between the rotor and the rotor housing wall.

18. A multiple variety seed meter for planting multiple varieties of seed in a single planting pass during row-crop planting of an agricultural field, the seed meter comprising:
a housing arranged at a row unit of a planter and defining an enclosure that surrounds a housing cavity;
a seed disk arranged at least partially within the housing cavity and configured for singulation of seeds for individual delivery onto the agricultural field while planting;
a segmented sump arrangement defined within the housing cavity, the segmented sump including,
an active sump segment configured to hold seed in an active seed pool within the housing cavity for exposure to the seed disk for singulation;

an inactive sump segment configured to hold seed in an inactive seed pool within the housing cavity to block exposure to the seed disk for singulation; and a seed input port arranged in communication with the active sump segment for selectively supplying seed from one of a plurality of seed varieties to the active sump segment through the seed input port;

a rotor housing arranged within the housing cavity with a switching opening defined in the rotor housing;

a rotor arranged for selective rotation within the rotor housing with the rotor defining, a non-switching state when the rotor is not rotating and the inactive sump segment is defined between the rotor and the rotor housing; and a switching state when the rotor is rotating and moves seeds between the active and inactive sump segments through the switching opening of the rotor housing.

19. The multiple variety seed meter of claim 18, further comprising a seed evacuation port arranged within the inactive sump segment for selectively removing seed from the inactive sump segment.

* * * * *